United States Patent [19]

Uchiyama

[11] Patent Number: 5,911,005
[45] Date of Patent: *Jun. 8, 1999

[54] CHARACTER RECOGNITION METHOD AND SYSTEM

[75] Inventor: Yukinaka Uchiyama, Narashino, Japan

[73] Assignee: Ricoh Company, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/560,748

[22] Filed: Nov. 20, 1995

[30] Foreign Application Priority Data

Nov. 18, 1994 [JP] Japan .................................. 6-284674
Aug. 8, 1995 [JP] Japan .................................. 7-202555

[51] Int. Cl.$^6$ ............................................... G06K 9/00
[52] U.S. Cl. ......................... 382/187; 382/177; 382/198
[58] Field of Search .................................. 382/187, 181, 382/182, 185, 186, 190, 194, 195, 197, 202, 199, 198, 173, 177, 217–220

[56] References Cited

U.S. PATENT DOCUMENTS

| | | | |
|---|---|---|---|
| 4,903,312 | 2/1990 | Sato | 382/21 |
| 4,903,313 | 2/1990 | Tachikawa | 382/197 |
| 4,959,870 | 9/1990 | Tachikawa | 382/56 |
| 4,972,499 | 11/1990 | Kurosawa | 382/199 |
| 5,020,121 | 5/1991 | Rosenberg | 382/56 |
| 5,086,490 | 2/1992 | Peppers et al. | 382/197 |
| 5,138,668 | 8/1992 | Abe | 382/185 |
| 5,271,068 | 12/1993 | Ueda et al. | 382/216 |
| 5,606,628 | 2/1997 | Miyabe et al. | 382/190 |
| 5,621,818 | 4/1997 | Tashiro | 382/227 |
| 5,687,251 | 11/1997 | Erler et al. | 382/199 |
| 5,703,963 | 12/1997 | Kojima et al. | 382/199 |
| 5,841,902 | 11/1998 | Tu | 382/187 |

FOREIGN PATENT DOCUMENTS

| | | | |
|---|---|---|---|
| 59-202823 | 11/1984 | Japan . | |
| 59-202825 | 11/1984 | Japan . | |
| 61-25283 | 2/1986 | Japan | 382/185 |
| 63-14291 | 1/1988 | Japan . | |
| 1-116892 | 5/1989 | Japan . | |
| 3-286390 | 12/1991 | Japan . | |

*Primary Examiner*—Edward L. Coles
*Assistant Examiner*—Madeleine AV Nguyen
*Attorney, Agent, or Firm*—Knoble & Yoshida LLC

[57] ABSTRACT

The current invention is directed to further improve the character recognition process based upon the comparison of identification value in a sample image and a reference image by adjusting the identification value of the sample image. The adjustment is made based upon a predetermined feature of the sub-area or a mesh region of the images. The desired improvement in accuracy is obtained especially for recognizing handwritten characters.

20 Claims, 8 Drawing Sheets

| A | B | C | D |
|---|---|---|---|
| E | F | G | H |
| I | J | K | L |
| M | N | O | P |

CHARACTER RECOGNITION METHOD
AND SYSTEM

BACKGROUND OF THE INVENTION

1. Field of the Invention

The current invention is generally related to a system and a method of comparing a given sample image with a predetermined set of reference images and is more particularly related to a system and a method of improving the above pattern matching by adjusting a feature value of the sample image according to predetermined characteristics of the sample image with respect to those of the corresponding reference image.

2. Related Prior Art

In the field of image recognition, a predetermined set of standard image patterns is stored in a library and used as a standard for recognizing a given image pattern. The given sample pattern is generally compared to the above-described standard images to determine whether an acceptable match exists. The above-described recognition process is substantially the same in character recognition. A predetermined character set is generally stored in the digital format for comparison, and an inputted sample character is compared to the digitally stored characters for recognition.

Figure 1:
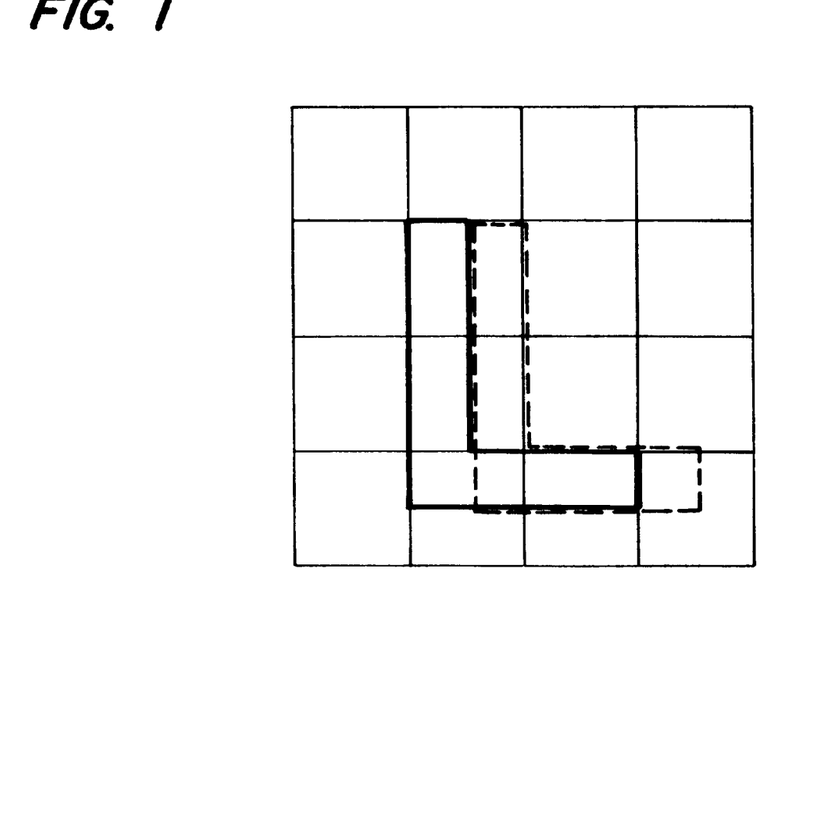
FIG. 1 diagrammatically illustrates a positional shift of the input character data.

In prior art character recognition, when an inputted character as a whole is compared to the stored reference character, due to various factors such as the size, font and position shift of the inputted character, character recognition is not easily accomplished. To improve the recognition of a character, the inputted data is generally broken into smaller units each representing a part of the character, and the small data units are compared with the corresponding parts of the reference character data. For example, as shown in FIG. 1, inputted character data is indicated by the dotted line while the stored reference data is shown by the solid line. Although the inputted character has the same size and font for a character "L," the inputted character is shifted to the right. Because of the positional shift, when the inputted data as a whole is compared with the stored data, the inputted character is not recognized as "L." However, when the comparison is made for each of the divided sub-areas based upon a predetermined feature such as the number "on" pixels and the length of edges, such a pattern matching method recognizes the sampled input as "L."

Figure 2:
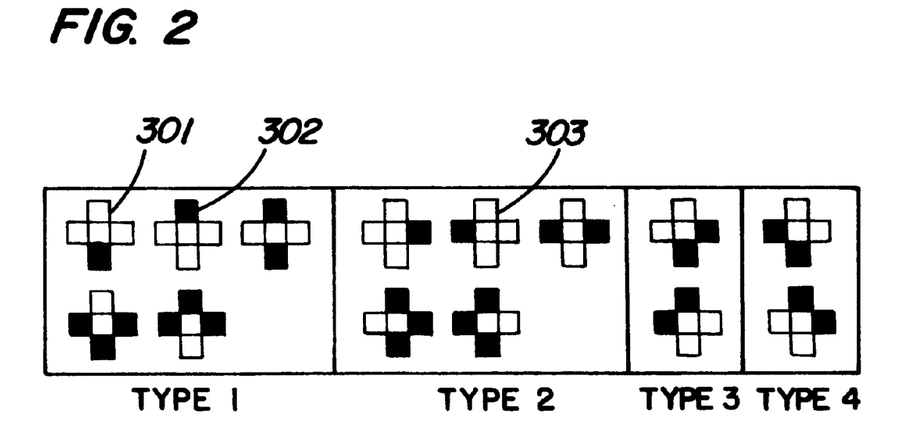
FIG. 2 illustrates a predetermined set of pixel patterns and associated identification values.

In addition to the above-described improved prior art character recognition method for accommodating the variations in the input data, the inputted data is divided into variable sizes of sub-areas as disclosed in Japanese Patent Nos. 59-202823 and 59-202825. These prior art references also disclose that a predetermined set of identification values is assigned to certain pixel patterns. For example, FIG. 2 illustrates a predetermined set of pixel patterns and associated identification values. Type 1 patterns include five predetermined patterns that share a certain common feature. In dividing the input character data according to the above-described prior art references, the identification values are distributed among the divided sub-areas in a predetermined manner. Under this scheme, the sub-areas are often unequal in size. The above-described identification values are compared between the sample character and the reference character for recognition.

Figure 3A:
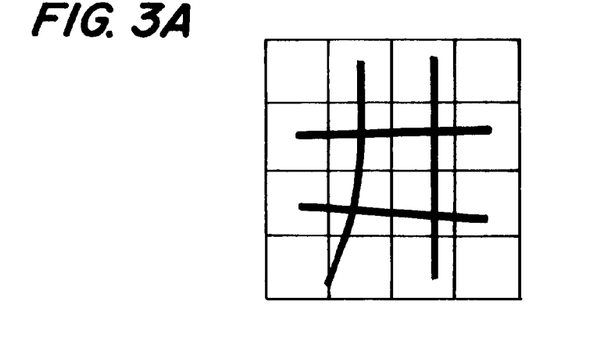
FIGS. 3A–C illustrate a non-linear character normalization process.
Figure 3B:
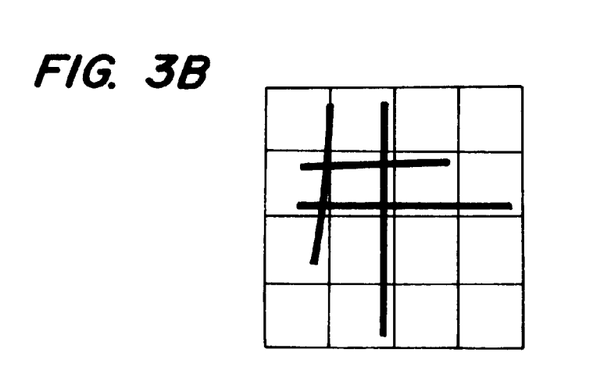
Figure 3C:
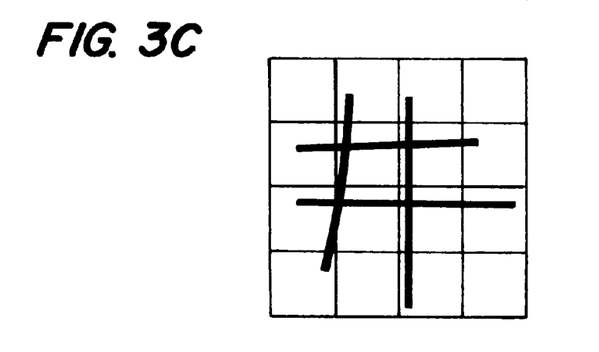

Even with the above-described character recognition method, handwritten characters are not often correctly recognized. This is because handwritten characters have other inconsistencies in addition to the size, font and positional shift. Because of these inconsistencies, to recognize a handwritten character, prior art attempts further included character image standardization. For example, Japanese Patent No. 1-116892 and "Improvement by Non-Linear Normalization" by Hiromi Yamada, Electronic Information and Communication," D-439, Spring Conference 1988, both disclose a technique for normalizing a character image by expanding or compressing certain portions of the input character image. To illustrate normalization, referring to FIG. 3A, a Japanese character " " is used as a reference character. Although FIGS. 3B and 3C show the same character, since they are handwritten, certain lines such as the left vertical line are shorter than the corresponding lines in the standard character of FIG. 3A. Certain other lines such as the bottom horizontal line in FIG. 3B are longer than the corresponding line in the standard character in FIG. 3A. When these lines are locally expanded or compressed, the normalized character becomes substantially similar to the reference character. However, to determine what portion of the character image needs to be modified, the above normalization technique requires additional processing. For example, Japanese Patent No. 3-286390 discloses an interpolation technique using a spline function to normalize a non-linear shape. Furthermore, when an orientation of an input character does not coincide with that of a reference character, to correct the orientation, the normalization technique becomes even more complex.

Figure 4A:
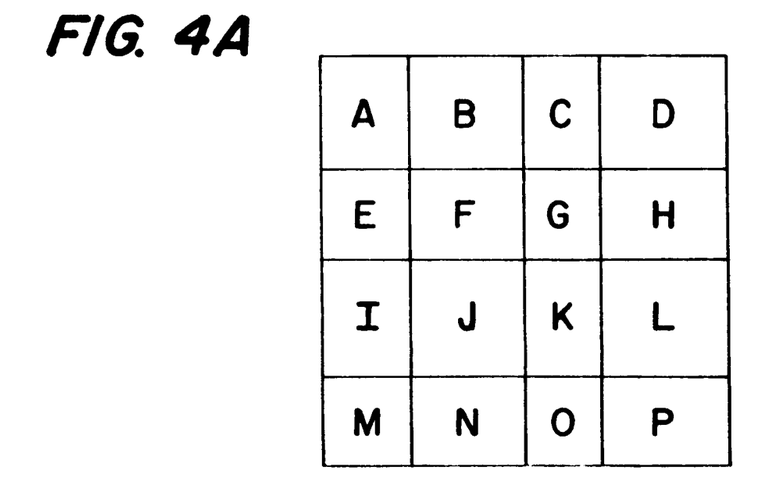
FIG. 4 illustrates an example of sub-regions and integrated mesh regions.
Figure 4B:
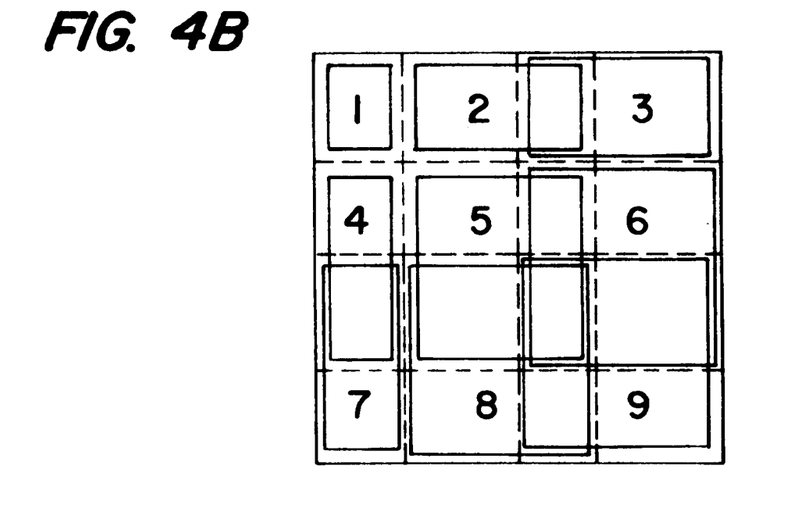

To simplify the above recognition technique, prior art attempts also included a technique using overlapping variable mesh regions as disclosed in U.S. Pat. No. 4,903,313. According to this technique, a sample image is first divided into sub-regions based upon a predetermined rule. As already discussed above, for example, the identification values are equally distributed among the sub-regions, and the sub-regions are often unequal in their sizes. Then, as FIG. 4 illustrates, the sub-regions are integrated into a smaller number of mesh regions. Consequently, some mesh regions are overlapping with each other. In other words, due to overlapping of the adjacent overlapping regions, certain identification values are used in at least two mesh regions. Because of the redundancy of certain identification values, when a sample character has variations from a reference character, an effect on pattern matching is substantially minimal.

Figure 5A:
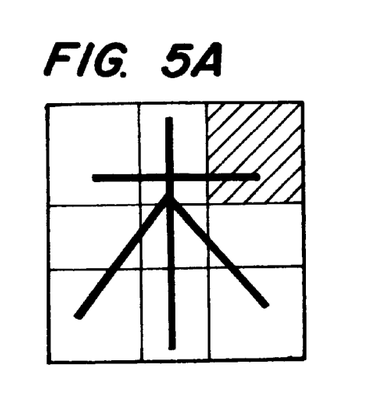
FIGS. 5A and 5C respectively illustrate a reference character and a sample handwritten character signifying a tree in the Japanese language.
Figure 5B:
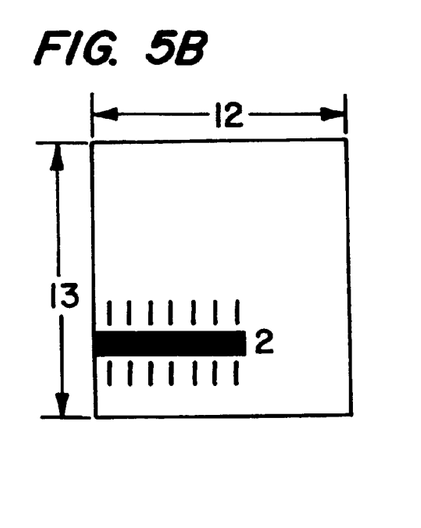
FIGS. 5B and 5D respectively illustrate an enlarged portion of a corresponding portion as indicated in FIGS. 5A and 5C.
Figure 5C:
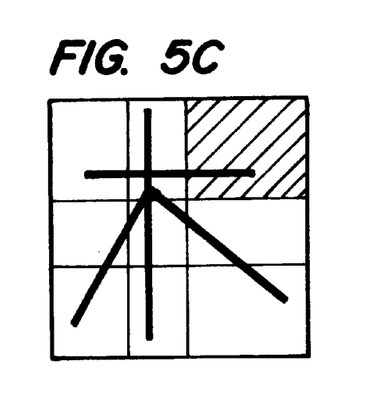
Figure 5D:
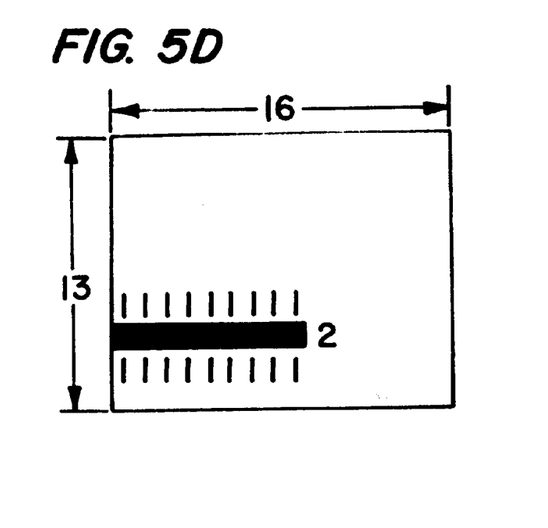

On the other hand, the size of each mesh region differs significantly when handwritten characters are processed. In fact, the size difference of sub-areas is a crucial problem in maintaining an acceptable level of accuracy for character recognition. The size difference of the divided sub-areas tends to cause a deviation in the identification value from the predetermined reference identification value. FIGS. 5A–5D illustrate the above-described problem using a Japanese character meaning a tree. Assuming that FIG. 5A is a reference character while FIG. 5C is a handwritten sample character, the corresponding upper right sub-areas contain a part of the horizontal line of the character. Because the character in FIG. 5C is handwritten, it is not completely symmetrical between the right and left halves about the vertical line. In FIGS. 5B and 5D, the corresponding portions are shown in enlarged views. Although the height of these corresponding portions is the same, the width is different by 4 arbitrary units. Consequently, the corresponding portion in FIGS. 5B and 5D respectively contains seven and nine dark pixels. In terms of the number of patterns, the same pixel may be counted twice depending upon the position of the center pixel of the predetermined pattern. For this reason, the upper right portion as shown in FIG. 5B contains fourteen type 1 patterns (half of which is 301 and the other half 302) and one type 2 pattern 303, as defined in FIG. 2. However, the corresponding portion as shown in FIG. 5D for a handwritten character as shown in FIG. 5C contains eighteen type 1 patterns and one type 2 pattern. Because of the above noted difference in the number of patterns in the corresponding sub-area, recognition of a handwritten character is less accurate. In order to improve the recognition capability for handwritten characters, a proper adjustment needs to be made to the identification values.

SUMMARY OF THE INVENTION

To solve the above and other problems, one of the objectives of the current invention is to provide a method and a system which improves the accuracy level of hand-written character recognition based upon sub-areas having different sizes.

According to the current invention, a method of recognizing a predetermined set of standard images, each of the standard images having predetermined standard sub-ares, each of the predetermined standard sub-areas having a standard value, including the steps of: a) dividing a sample image into predetermined sample sub-areas; b) extracting a sample value for each of the predetermined sample sub-areas; c) adjusting the sample value according to a predetermined feature of each of the predetermined sample sub-areas with respect to corresponding each of the predetermined standard sub-areas; and d) comparing the sample value after the step c) and the standard value for determining if the sample image matches the standard image.

According to another aspect of the current invention, a system of recognizing a predetermined set of standard images, each of the standard images having predetermined standard sub-ares, each of the predetermined standard sub-areas having a standard value, including: a dividing unit for dividing a sample image into predetermined sample sub-areas; an extracting unit operationally connected to the dividing unit for extracting a sample value for each of the predetermined sample sub-areas; an adjusting unit operationally connected to the extracting unit for adjusting the sample value according to a predetermined feature of each of the predetermined sample sub-areas with respect to corresponding each of the predetermined standard sub-areas; and a comparing unit in response to the adjusting unit for comparing the sample value and the standard value for determining if the sample image matches the standard image.

DETAILED DESCRIPTION OF THE PREFERRED EMBODIMENT

Figure 6:
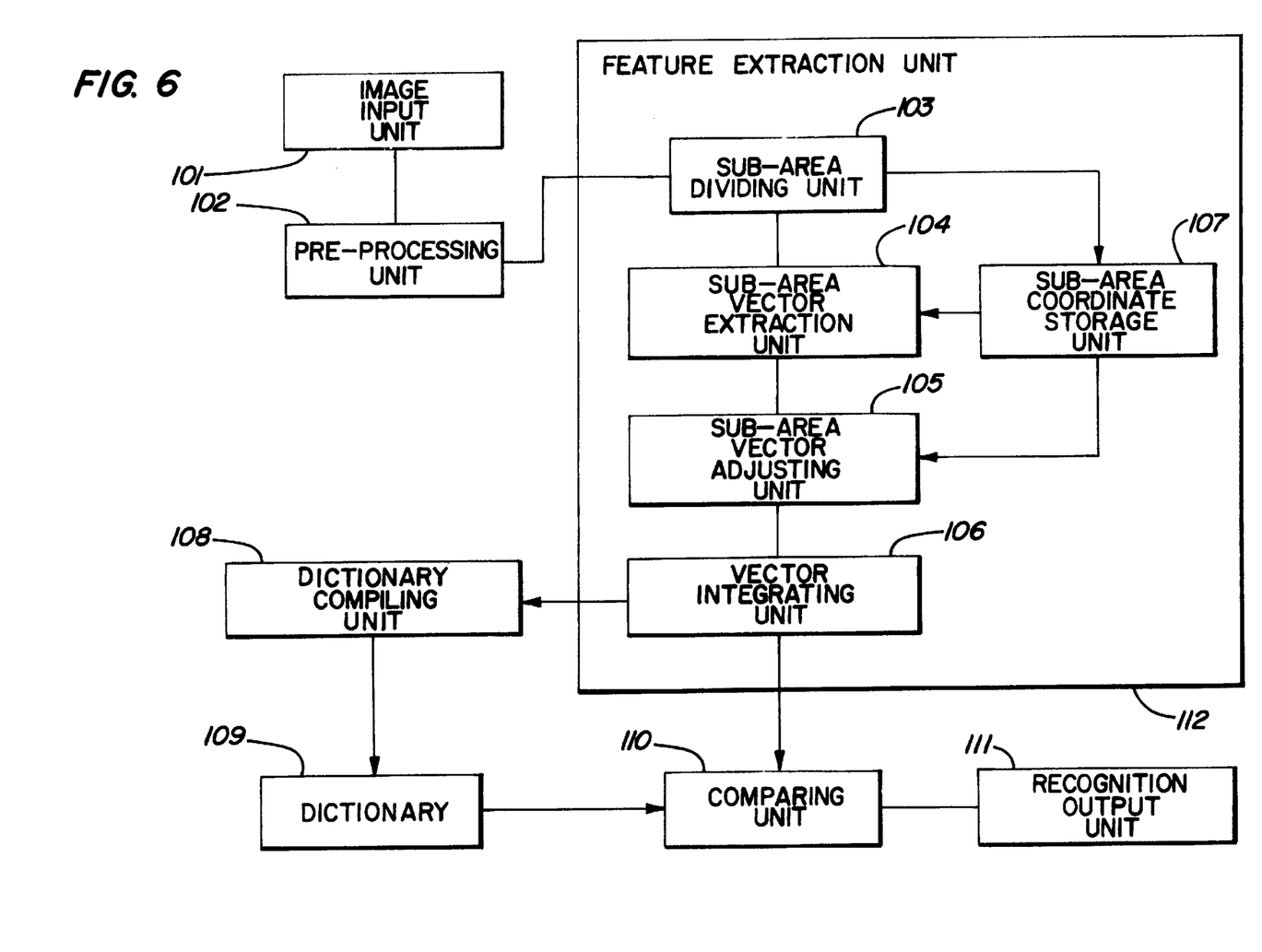
FIG. 6 is a block diagram depicting one preferred embodiment of the image recognition system according to the current invention.

Referring to FIG. 6, one preferred embodiment of the image recognition system of the current invention includes an image input unit 101, a pre-processing unit 102, a feature extraction unit 112, a dictionary compiling unit 108, a dictionary 109, a comparing unit 110, and a recognition output unit 111. The recognition system may be a part of scanners, digital copiers, word processors, and other character or image processing devices. The image input unit 101 digitizes an image such as handwritten or printed characters. The digitized image data is pre-processed to reduce a certain known noise signal or to normalize according to a device dependent characteristic. The feature extraction unit 112 further processes the pre-processed image data to extract vector characteristics of the inputted image for determining whether the image is recognized as one of the predetermined images. The predetermined set of images such as characters is compiled by the dictionary compiling unit 108 and stored in the dictionary 109. The comparing unit 110 makes the comparison of the reference image stored in the dictionary 109 and the adjusted and integrated sample image outputted by the vector integrating unit 106. The recognition output unit 111 outputs the result of the comparison from the comparing unit 110.

Still referring to FIG. 6, the feature extraction unit 112 further includes a sub-area dividing unit 103, a sub-area coordinate storage unit 107, a sub-area vector extraction unit 104, a sub-area vector adjusting unit 105 and a vector integrating unit 106. When the pre-processed image data is inputted into the feature extraction unit 112, the sub-area dividing unit 103 divides the pre-processed data into a predetermined number of small data units. For example, such a division is made based upon a predetermined rule to distribute the identification value equally among the divided sub-areas. Consequently, as already described, the divided sub-areas containing the substantially similar value often have the unequal sizes. The division rule will be further described later. Once the image area is subdivided, the sub-area vector extraction unit 104 extracts the vector or the identification value for each sub-area based upon the coordinates or sub-area specification parameters stored in the sub-area coordinate storage unit 107. The extracted vector or identification value of each sub-area is adjusted by the sub-area vector adjusting unit 105. Lastly, the vector integration unit 106 combines the adjusted vectors into one set of identification values so as to later use it for identifying the originally inputted image.

One example of the identification value set is a distribution histogram of the predetermined codes.

The sub-area vector adjusting unit 105 generally adjusts the extracted vector value or the identification value based upon a predetermined feature of the sub-area with respect to the corresponding sub-area size of the reference image stored in the dictionary 109. As described above, a handwritten character is more variable than its counterpart printed character. Not only the size of the character, but also relative distribution patterns of the identification characteristics are significantly different from a handwritten character written by one person to the same character written by another person.

For at least this reason, even though the same division rule is applied, the corresponding sub-areas between a sample image and a reference image may have significantly different identification values. Accordingly, one preferred embodiment of the sub-area vector adjusting unit 105 according to the current invention corrects the identification value based upon the ratio between the size of the sub-area and that of the reference image. The size is determined by the area, the length of a particular edge, and/or a diagonal line, and particular examples will be later given.

Still referring to FIG. 6, in order to compile the dictionary 109, the above-described units 103–107 process the input image data in the same manner as the sample image data prior to the above-described image recognition. For each of a predetermined set of characters, the vector integrating unit 106 outputs the adjusted and integrated vector data to the dictionary compiling unit 108 instead of the comparing unit 110. The dictionary compiling unit 108 in turn compiles the processed reference image data and stores it in the dictionary 109.

Figure 7:
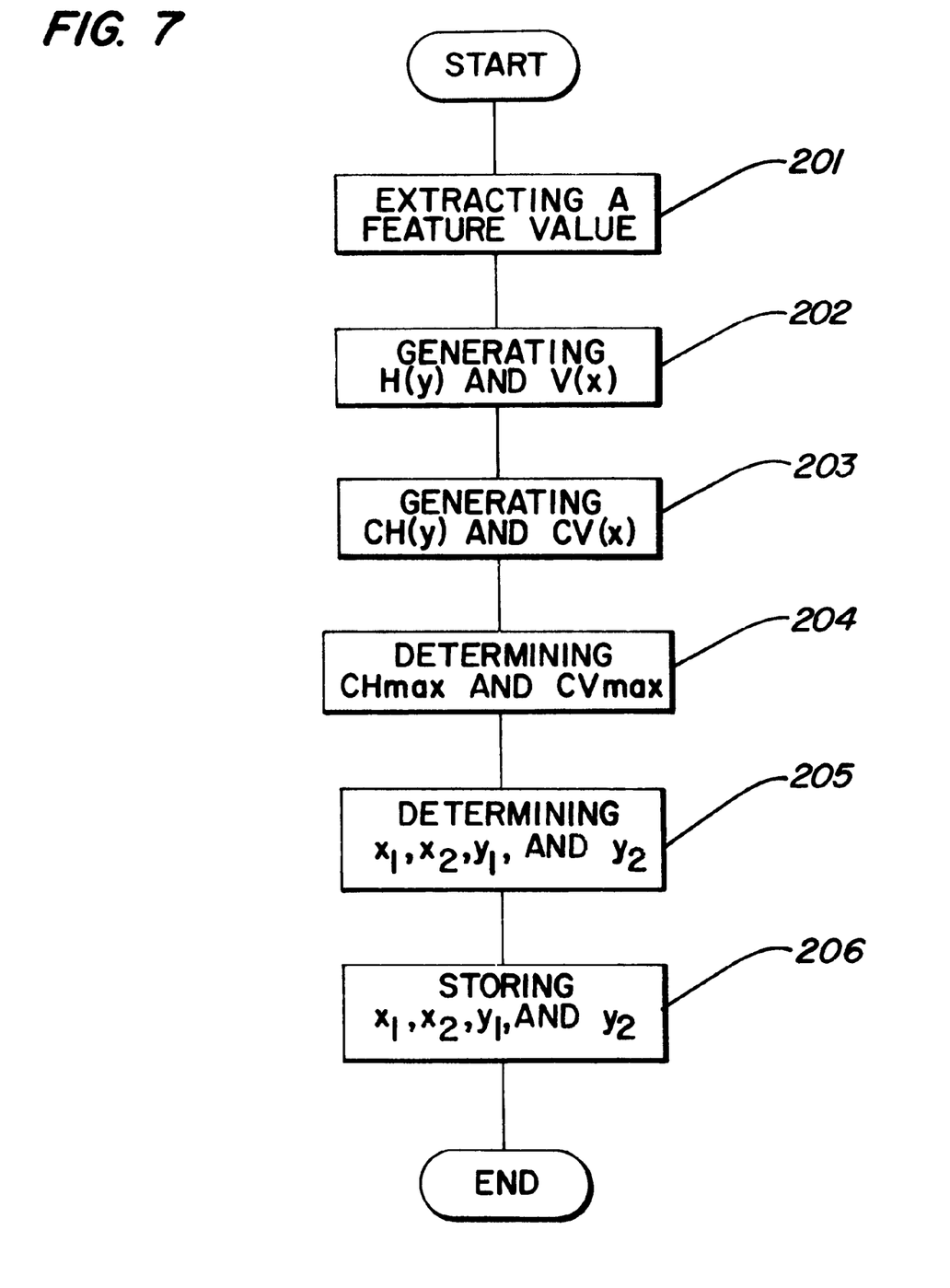
FIG. 7 is a flow chart depicting one example of a preferred process performed by the image recognition system according to the current invention.

FIG. 7, one example of a preferred process performed by certain units in the feature extraction unit 112 as shown in FIG. 6. At a step 201, in order to divide the image data into sub-areas, a feature or identification value is extracted in both vertical as well as horizontal directions. A step 202 generates corresponding distribution functions, H(y) for the horizontal distribution of the identification value and V(x) for the vertical distribution of the identification value. The above-generated functions H(y) and V(x) are converted into accumulated functions CH(y) about the y axis and CV(x) about the x axis in a step 203. In a step 204, the max values CH max for the horizontal accumulated distribution as well as CV max for the vertical cumulated distribution are determined. Based upon the above-specified max values in a step 205, the cumulated range is equally divided into the three sub-areas by determining two pairs of coordinates $x_1$, $y_1$, and $x_2$, $y_2$ such that the following equations are satisfied:

$$x_1 = \min\{x | CV(x) \geq \tfrac{1}{3} CV \max\}$$

$$x_2 = \min\{x | CV(x) \geq \tfrac{2}{3} CV \max\}$$

$$y_1 = \min\{y | CH(y) \geq \tfrac{1}{3} CH \max\}$$

$$y_2 = \min\{y | CH(y) \geq \tfrac{2}{3} CH \max\}$$

After determining the above-defined coordinates in a step 205, a step 206 stores these coordinates.

Figure 8:
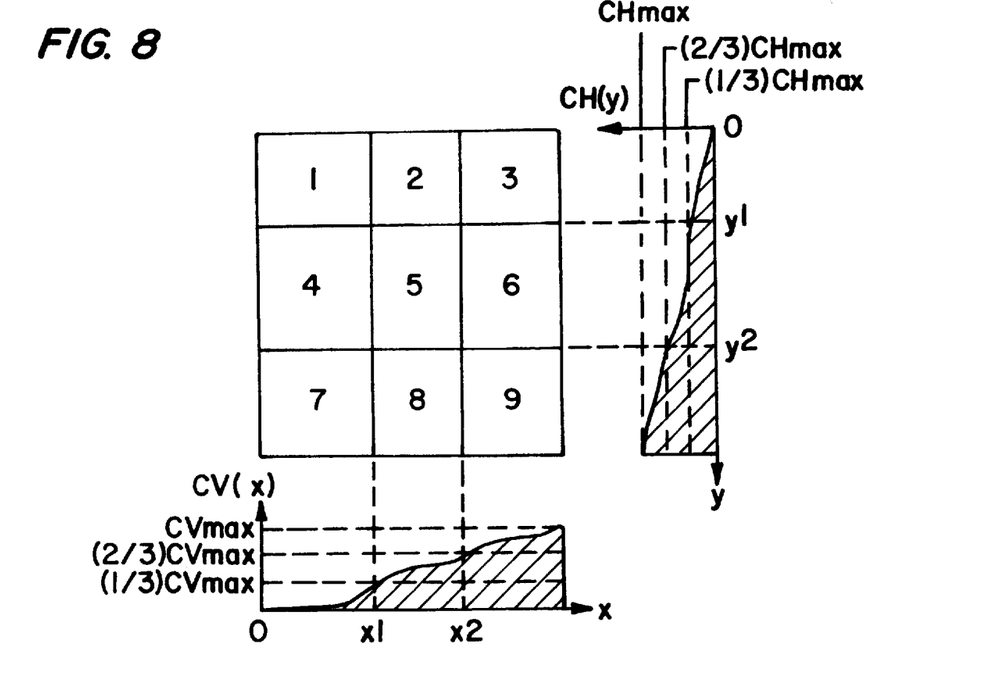
FIG. 8 graphically illustrates the steps described above with respect to FIG. 7.

Now referring to FIG. 8, the above-described steps 201–206 are diagrammatically summarized. The sub-areas 1–9 are determined by equally dividing the horizontal range between 0 and CHmax and the vertical range between 0 and CVmax. The three equally divided sub-ranges in the y direction are specified by 0, $y_1$, $y_2$ and CHmax. Similarly, the three equally divided sub-ranges in the x direction are specified by 0, $x_1$, $x_2$ and CVmax. These sub-ranges define the sub-areas from which an extraction value is extracted for the use in identifying the image as a whole.

To illustrate the above adjusting process according to the current invention, specific examples are illustrated in FIGS. 2, 5 and 9–11. Referring to FIG. 2, for example, after sub-dividing an image into a predetermined number of sub-areas, in each sub-area or mesh region, five pixels are examined at a time to find a match in the predetermined set of patterns. FIG. 2 illustrates patterns each of which contains a white or off pixel in the center of the five pixels. By scanning in a predetermined direction, a histogram is generated by counting the number of occurrences of each type consisting of the predetermined patterns. For example, type 1 is counted when the center, right, left and top pixels are off while the bottom pixel is on as shown in a pattern 301. For each mesh region $x_i$ (i=1, 2, . . . 9), four types of code 1 through 4 are counted. Although these counts may be strung together to be used as an identification value in the prior art, each of the counted value may be adjusted according to the current invention.

Now referring back to FIGS. 5A and 5B, as described above, the upper right portion as shown in FIG. 5B contains fourteen type 1 patterns (half of which is 301 and the other half 302) and one type 2 pattern 303, as defined in FIG. 2. However, the corresponding portion as shown in FIG. 5D for a handwritten character as shown in FIG. 5C contains eighteen type 1 patterns and one type 2 pattern. The ratio of these identification values (i.e. 18/14) is 1.29, while the difference between the above ratio and the ideal match ratio (i.e. 1.29–1.0) is almost 30%. In order to recognize the handwritten character of FIG. 5C as a reference character of FIG. 5A based upon the above described counts of predetermined pixel patterns, the identification values or the counts must be adjusted accordingly so that the values are substantially similar. When the ratio of the adjusted values is substantially close to 1 or an ideal match value, the two sub-areas or mesh regions are considered to be matched for the purposes of recognition.

To adjust the identification values, a predetermined feature of the sub-area may be used. According to one preferred embodiment, the adjustment is made based upon the width of the sub-regions as shown in FIGS. 5B and 5D. The identification value of the reference character in FIG. 5B is adjusted by dividing it with its width (i.e. 14/12=1.17). Similarly, the identification value of the reference character in FIG. 5D is adjusted by dividing it with its width (i.e. 18/16=1.13). The ratio of these adjusted values (1.13/1.17) is 0.97 and is substantially close to the ideal match value. In this example, since the height of the sub-areas is the same, the height cannot be used to adjust the identification value. However, the sum of the width and the length may be used to adjust the identification value in the above described manner. According to another embodiment, the adjustment is made based upon the length of a diagonal line of the sub-area. For example, the square root of $12^2$ and $13^2$ is 17.7 for FIG. 5B while that of $13^2$ and $16^2$ is 20.6.

The above described various adjustment parameters are used based upon the directionality of a particular type or group of pixel patterns. Referring back to FIG. 2, Type 1 patterns have a horizontal directionality while Type 2 patterns have a vertical directionality. Type 3 patterns have the right up directionality while Type 4 patterns have the right down directionalities. Based upon these directionalities, when a histogram is generated for accounting the number of occurrences for each directionality, the adjustment may be made using different adjustment parameters as follows:

$$W_i[1] = C1X_i[1]/LH_i$$

$$W_i[2] = C2X_i[2]/LV_i$$

$$W_i[3] = C3X_i[3]/SQR((LH_i)^2 + (LV_i)^2) \text{ or}$$
$$C3X_i[3]/(LH_i + LV_i)$$

$$W_i[4] = C4X_i[4]/SQR((LH_i)^2 + (LV_i)^2) \text{ or}$$
$$C4X_i[4]/(LH_i + LV_i)$$

where $i=1, 2, \ldots 9$; $W_i[\,]$ is the adjusted identification value; $X_i[\,]$ is an unadjusted identification value; $LH_i$ is the width of the sub-area; $LV_i$ is the height of the sub-area; SQR is square root. For example, $W_i[1]$ indicates an adjusted value for Type 1 while $X_i[1]$ indicates an unadjusted value for Type 1. C1 is a constant. A histogram generated based upon $W_i[1]$–$W_i[4]$ as a whole is used for identification or recognition.

Figure 9:
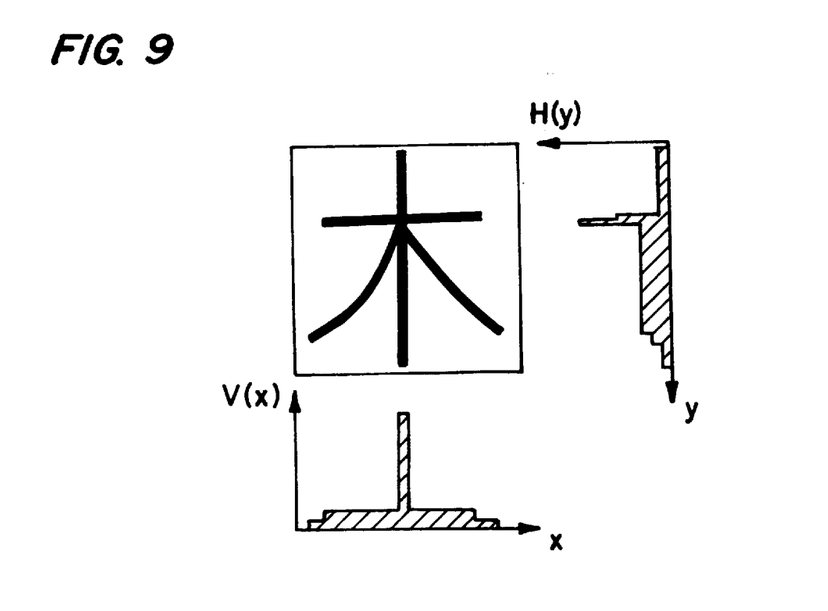
FIG. 9 illustrates a distribution histogram for indicating dark or on pixels in both x and y directions.

Now referring to FIG. 9, the distribution of dark or on pixels is shown in both X and Y directions. Based upon the above described process as shown in FIG. 7 or as illustrated in FIG. 8, the distribution of the number of dark pixels is used to determine the sub-areas. From each of these sub-areas, the identification values may be extracted and then adjusted based upon a selected parameter of the sub-area.

Figure 10:
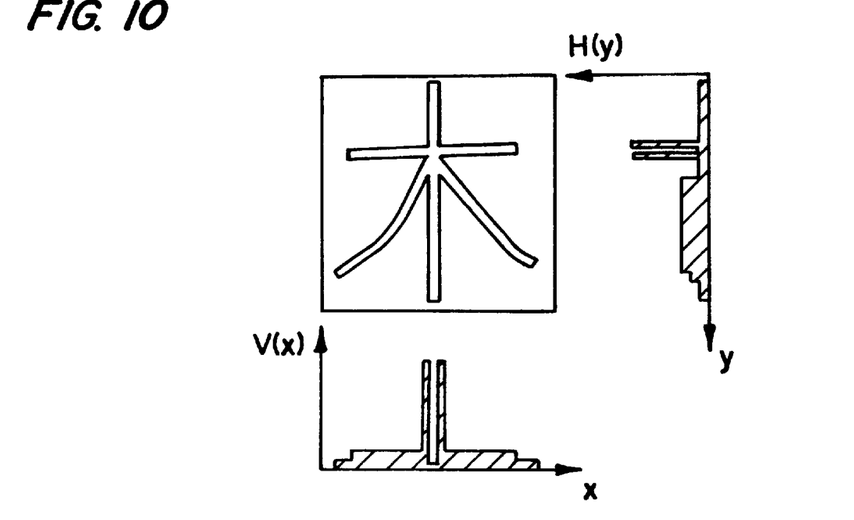
FIG. 10 illustrates a distribution histogram for indicating the number of pixels on the edges of an image in both x and y directions.
Figure 11:
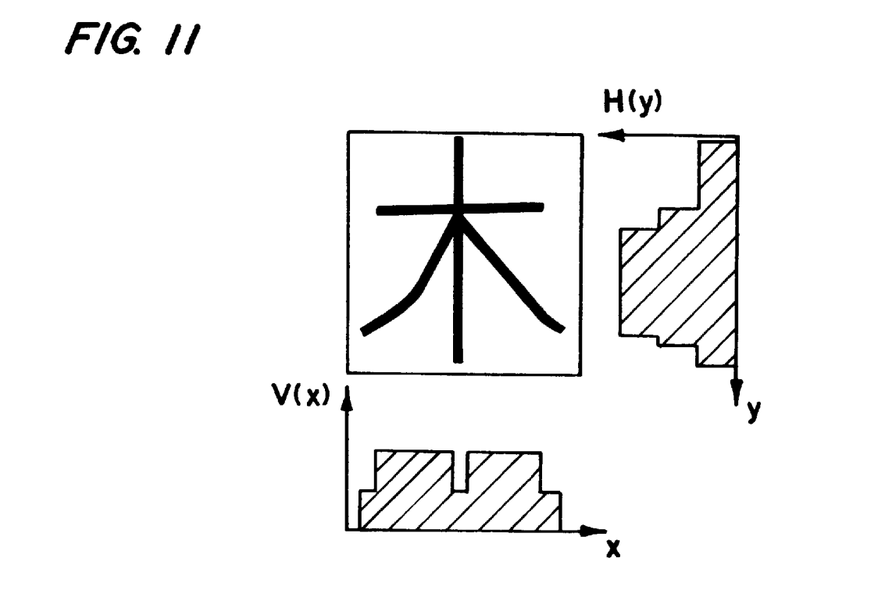
FIG. 11 illustrates a distribution histogram for the number of strokes in both x and y directions.

Referring to FIG. 10, the distribution of the pixels located on the edges of a given character is shown in both X and Y directions. Lastly, referring to FIG. 11, the distribution of the number of strokes to draw a character is shown in both X and Y directions. As described above, either of the above distributions is used in the same manner to divide sub-areas.

The above described adjustment process is also used in conjunction with overlapping mesh regions. As described in relation to FIGS. 4A and 4B, the sub-areas are integrated into a smaller number of mesh regions which have some overlapping areas between some of the adjacent mesh regions. The rule of integration for a mesh region of m th from the left and n th from the top is generally to include sub regions from P(m) to Q(m) starting from the left as well as sub regions from R(n) to S(n) starting from the top. The detailed description of the above integration rule has been disclosed in Japanese Patent No. 63-14291. After the sub regions are integrated into the mesh regions, the identification value of each mesh region is adjusted by one of the above described processes before identification or recognition. The accuracy level of recognizing handwritten characters is substantially increased by the above described adjustment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

It is claimed:

1. A method of recognizing a predetermined set of standard images, each of the standard images having predetermined standard sub-areas, each of the predetermined standard sub-areas having a standard value, comprising the steps of:
   a) dividing a sample image into a predetermined number of sample polygonal sub-areas, at least one of said sample polygonal sub-areas having a different size from a size of a corresponding one of said predetermined standard sub-areas;
   b) extracting a sub-area sample feature value for each of said predetermined sample polygonal sub-areas;
   c) determining a first ratio between said sub-area sample feature value and a predetermined size measure of each of said sample polygonal sub-areas as well as a second ratio between a corresponding feature value and a corresponding size measure of each of the predetermined standard sub-areas; and
   d) comparing said said first ratio and said second ratio determined in said step c) for determining if said sample image matches said standard image.

2. The method according to claim 1 wherein said standard images include characters.

3. The method according to claim 2 wherein said characters are hand-written.

4. The method according to claim 3 wherein said step a) further comprises the steps of:
   i) dividing one of said characters into a first number of sub-regions;
   ii) integrating said first number of sub-regions into a second number of mesh-regions based upon a predetermined rule, said first number being larger than said second number, some of said mesh-regions having overlapping areas with adjacent mesh-regions, said mesh-regions also defining said sub-areas.

5. The method according to claim 1 wherein said sample value has a predetermined number of components, each of said components having a predetermined value.

6. The method according to claim 1 wherein said predetermined feature in said step c) is an area.

7. The method according to claim 1 wherein said predetermined size measure in said step c) is a length of a diagonal line.

8. The method according to claim 1 wherein said steps b) and c) are repeated to generate multiple sets of said first ratios and said second rations.

9. The method according to claim 8 wherein said multiple sets of said first ratios and said second ratios are each multiplied by a predetermined constant.

10. The method according to claim 9 wherein each of said multiple sets of said first ratios and said second ratios as a whole is compared with each other in said step d).

11. The system according to claim 10 wherein said extraction unit extracts a plurality of said sub-area sample feature values while said determining unit determines multiple sets of said first ratios and said second ratios.

12. The system according to claim 11 wherein said determining unit further multiplies each of said first ratios and said second ratios by a predetermined constant.

13. The system according to claim 12 wherein said comparing unit compares each of multiple sets of said first ratios and said second ratios as a whole.

14. A system of recognizing a predetermined set of standard images, each of the standard images having predetermined standard sub-areas, each of the predetermined standard sub-areas having a standard value, comprising:
   a dividing unit for dividing a sample image into a predetermined number of sample polygonal sub-areas, at least one of said sample polygonal sub-areas having a different size from a size of a corresponding one of said predetermined standard sub-areas;
   an extracting unit operationally connected to said dividing unit for extracting a sub-area sample feature value for each of said predetermined sample polygonal sub-areas;

a determining unit operationally connected to said extracting unit for determining a first ratio between said sub-area sample feature value and a predetermined size measure of each of said sample polygonal sub-areas as well as a second ratio between a corresponding feature value and a corresponding size measure of each of the predetermined standard sub-areas; and a comparing unit in response to said adjusting unit for comparing said first ratio and said second ration for determining if said sample image matches said standard image.

15. The system according to claim 14 wherein said standard images include characters.

16. The system according to claim 14 wherein said characters are hand-written.

17. The system according to claim 14 wherein said dividing unit further comprises a sub-region divider for dividing one of said characters into a first number of sub-regions and an integrator for integrating said first number of sub-regions into a second number of mesh-regions based upon a predetermined rule, said first number being larger than said second number, some of said mesh-regions having overlapping areas with adjacent mesh-regions, said mesh-regions also defining said sub-areas.

18. The system according to claim 14 wherein said sample value has a predetermined number of components, each of said components having a predetermined value.

19. The system according to claim 14 wherein said predetermined feature is an area.

20. The system according to claim 14 wherein said predetermined size measure is a length of a diagonal line.

* * * * *